(12) United States Patent
Taira

(10) Patent No.: US 11,132,579 B2
(45) Date of Patent: Sep. 28, 2021

(54) CONTOUR RECOGNITION DEVICE, CONTOUR RECOGNITION SYSTEM AND CONTOUR RECOGNITION METHOD

(71) Applicant: FANUC CORPORATION, Yamanashi (JP)

(72) Inventor: Yuuji Taira, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 125 days.

(21) Appl. No.: 16/734,778

(22) Filed: Jan. 6, 2020

(65) Prior Publication Data

US 2020/0257923 A1 Aug. 13, 2020

(30) Foreign Application Priority Data

Feb. 7, 2019 (JP) .............................. JP2019-020670

(51) Int. Cl.

| | |
|---|---|
| *G06K 9/48* | (2006.01) |
| *G06T 7/55* | (2017.01) |
| *G01B 11/25* | (2006.01) |
| *G06T 7/521* | (2017.01) |
| *G01B 11/24* | (2006.01) |

(52) U.S. Cl.
CPC ............ *G06K 9/48* (2013.01); *G01B 11/2433* (2013.01); *G01B 11/2545* (2013.01); *G06T 7/521* (2017.01); *G06T 7/55* (2017.01); *G06T 2207/30164* (2013.01)

(58) Field of Classification Search
CPC .. G06K 9/48; G06T 7/55; G06T 7/521; G06T 2207/30164; G01B 11/2545; G01B 11/2433
See application file for complete search history.

(56) References Cited

U.S. PATENT DOCUMENTS

| | | | | |
|---|---|---|---|---|
| 2002/0031265 | A1* | 3/2002 | Higaki | G06K 9/48 382/199 |
| 2014/0140579 | A1* | 5/2014 | Takemoto | G01C 3/08 382/106 |

(Continued)

FOREIGN PATENT DOCUMENTS

JP 2001-285762 10/2001

*Primary Examiner* — Zhitong Chen
(74) *Attorney, Agent, or Firm* — Wenderoth, Lind & Ponack, L.L.P.

(57) ABSTRACT

A contour recognition device includes: a projecting unit which projects pattern light; a light quantity adjustment unit which adjusts a light quantity of the pattern light; two photographing units which capture, from different viewpoints, the target and the placement surface; a distance calculation unit which calculates a distance at every two-dimensional position; an image generation unit which generates a distance image which gradient expresses a distance from a maximum distance until a minimum distance at every two-dimensional position; and a contour extraction unit which extracts a contour of the target, in which the light quantity adjustment unit adjusts the light quantity so that the distance of at least the contour of the target cannot be calculated, and the distance of the placement surface can be calculated, and the image generation unit generates an image so that a maximum distance becomes a distance greater than the distance of the placement surface.

4 Claims, 4 Drawing Sheets

(56) References Cited

U.S. PATENT DOCUMENTS

| | | | | |
|---|---|---|---|---|
| 2016/0029006 A1* | 1/2016 | Zoken | ............... | H04N 13/221 |
| | | | | 348/50 |
| 2018/0330481 A1* | 11/2018 | Watanabe | ............... | G06T 5/006 |
| 2020/0204786 A1* | 6/2020 | Nakata | ............... | G03B 19/06 |

* cited by examiner

CONTOUR RECOGNITION DEVICE, CONTOUR RECOGNITION SYSTEM AND CONTOUR RECOGNITION METHOD

This application is based on and claims the benefit of priority from Japanese Patent Application No. 2019-020670, filed on 7 Feb. 2019, the content of which is incorporated herein by reference.

BACKGROUND OF THE INVENTION

Field of the Invention

The present invention relates to a contour recognition device, contour recognition system and contour recognition method.

Related Art

In a factory or the like, equipment has been utilized which captures by a camera a workpiece placed on a conveyor belt and conveyed, recognizes the contour (profile) of the workpiece by image processing, and picks up the workpiece by a robot arm or the like. With such equipment, in a case of the color of the workpiece (target) and the color of the conveyor belt (background) having a close resemblance or case of the workpiece being transparent (relatively high light transmittance), there is a possibility of not being able to accurately recognize the contour of the workpiece by way of image processing.

In order to recognize the contour of the workpiece, it has been considered to measure the distance to the photographing subject at every two-dimensional position (pixel) of an image captured by the camera, and use a distance image displaying the color of each pixel as a color (e.g., shade) corresponding to distance. As technology for obtaining such a distance image, a three-dimensional measurement technique has been known which projects pattern light onto the surface of a measurement object, captures images of the pattern light projected onto the surface of the target by two cameras arranged at difference positions, and calculates a distance until the target at every pixel of the captured image, based on the parallax between the images captured by the two cameras (for example, refer to Patent Document 1).

Patent Document 1: Japanese Unexamined Patent Application, Publication No. 2001-285762

SUMMARY OF THE INVENTION

In a three-dimensional measurement technique which projects pattern light onto a target surface, in the case of the target being transparent, it may not be possible to recognize the pattern projected on the target surface, and not possible to calculate distance. For this reason, technology has been desired which can accurately detect the contour of a target having transparency.

A contour recognition device according to an aspect of the present disclosure is a contour recognition device for recognizing a contour of a target disposed on a placement surface, and includes: a projecting unit which projects pattern light onto the target and the placement surface; a light quantity adjustment unit which adjusts a light quantity of the pattern light of the projecting unit; two photographing units which capture, from different viewpoints, images including reflected light of the pattern light from the target and the placement surface; a distance calculation unit which calculates a distance until the target and the placement surface at every two-dimensional position from a parallax of images captured by the two photographing units from different viewpoints; an image generation unit which generates a distance image which gradient expresses a distance calculated by the distance calculation unit from a maximum distance until a minimum distance at every two-dimensional position, and represents a position at which distance cannot be calculated by the distance calculation unit by a different tone than the placement surface; and a contour extraction unit which extracts a contour of the target by way of image processing on the distance image generated by the image generation unit, in which the light quantity adjustment unit adjusts the light quantity of the projecting unit so that the distance of at least the contour of the target cannot be calculated, and the distance of the placement surface can be calculated by the distance calculation unit, and the image generation unit generates an image so that a maximum distance in gradient expression of the distance image becomes a distance greater than the distance of the placement surface.

A contour recognition method according to another aspect of the present disclosure is a method for recognizing a contour of a target disposed on a placement surface, the method including the steps of: projecting pattern light onto the target and the placement surface; capturing, from different viewpoints, images including reflected light of the pattern light from the target and the placement surface; calculating a distance from a parallax of two images captured from the different viewpoints until the target and the placement surface at every two-dimensional position; generating a distance image which gradient expresses the distance calculated from the two images at every two-dimensional position, and represents a position at which distance could not be calculated in the step of calculating the distance in a different tone from the placement surface; and extracting a contour of the target by image processing on the distance image, in which the light quantity of the pattern light is set, in the step of projecting the pattern light, so that distance of at least a contour of the target cannot be calculated, and the distance of the placement surface can be calculated in the step of calculating the distance, and a maximum distance in the gradient expression of the distance image is set, in the step of generating the distance image, to a distance greater than the distance of the placement surface.

According to the contour recognition device and contour recognition method of the present disclosure, even in a case of the target having transparency, it is possible to accurately detect the contour thereof.

DETAILED DESCRIPTION OF THE INVENTION

Figure 1:
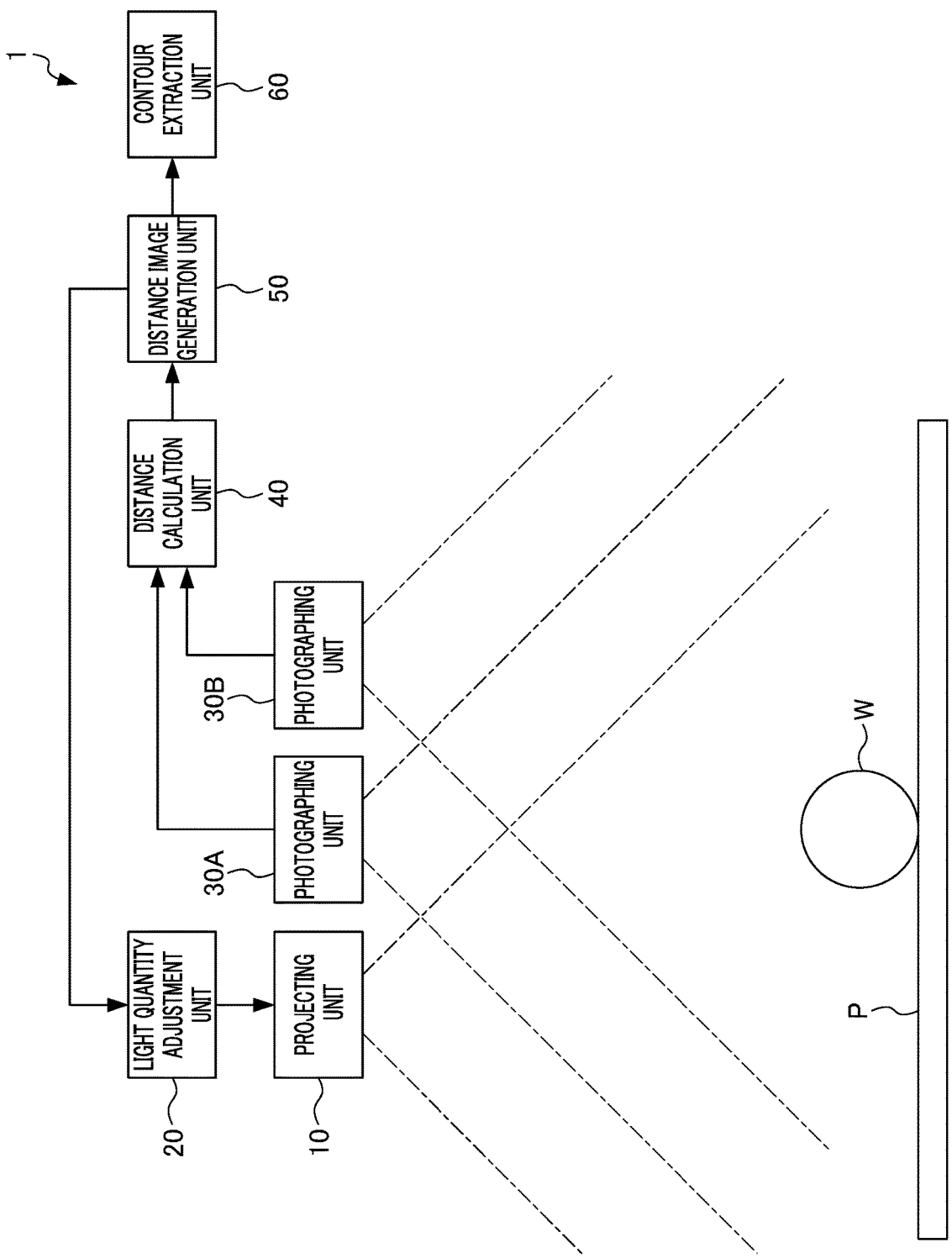
FIG. 1 is a schematic diagram showing the configuration of a contour recognition device according to an embodiment of the present disclosure.

Hereinafter, an embodiment of the present invention will be explained while referencing the drawings. FIG. 1 is a schematic diagram showing the configuration of a contour recognition device of the present invention. The contour recognition device 1 in FIG. 1 recognizes the contour of a target W having transparency arranged on a placement surface P.

The contour recognition device 1 includes: a projecting unit 10 which projects pattern light onto the target W and placement surface P; a light quantity adjustment unit 20 which adjusts the light quantity of the pattern light of the projecting unit 10; two photographing units 30A, 30B which capture images containing reflected light of the pattern light from the target W and placement surface P from different viewpoints; a distance calculation unit 40 which calculates the distance from the parallax of the images captured from different viewpoints by the two photographing units 30A, 30B until the target W and placement surface P at every two-dimensional position; an image generation unit 50 which generates a distance image which gradient expresses the distance calculated by the distance calculation unit 40 from the maximum distance to the minimum distance at every two-dimensional position, and represents a position at which the distance calculation unit 40 cannot calculate the distance in a different tone from the placement surface (same tone as maximum distance in the present embodiment); and a contour extraction unit 60 which extracts the contour of the target W by image processing the distance image generated by the image generation unit 50.

The projecting unit 10 only needs to be able to project pattern light; however, a projector is typically used. The pattern of the pattern light projected by the projecting unit 10 shall be a pattern having a plurality of characteristic points on a two-dimensional plane perpendicular to the optical axis, preferably arranged in a regular form.

The light quantity adjustment unit 20 controls the light quantity of the projecting unit 10 so as not to be able to calculate the distance of at least the contour of the target W (outer edge part when viewing from the projecting unit 10), and to be able to calculate the distance of the placement surface P, by way of the distance calculation unit 40.

The photographing units 30A, 30B can be configured by cameras having an optical system which forms an image of light from a subject; and a two-dimensional image sensor which converts the formed image into electrical signals at every two-dimensional position. The photographing units 30A, 30B are preferably arranged so that the distances from the placement surface P are equal to each other. In addition, the photographing units 30A, 30B are preferably arranged so that the optical axes of the optical systems become substantially perpendicular to the placement surface P.

The photographing units 30A, 30B capture images containing the reflected light of the pattern light by the target W and placement surface P from different viewpoints. In other words, the photographing units 30A, 30B capture images of the target W and placement surface P on which a pattern-like design is cast on the surface by the pattern light.

The distance calculation unit 40 extracts the coordinates of characteristic points of the pattern by the pattern light in the image captured by the photographing units 30A, 30B, and calculates the parallax of characteristic points corresponding to two images. Then, the distance calculation unit 40 calculates the distance from the photographing units 30A, 30B until the point at which the characteristic points of the pattern light is projected onto the surface of the target W or placement surface P, based on the parallax of each characteristic point. The distance calculation unit 40 can thereby calculate the distance until the target W or placement surface P at every two-dimensional position perpendicular to the optical axes of the photographing units 30A, 30B.

It should be noted that, in the case of there being a portion at which not able to sufficiently recognize the pattern projected onto the surface of the target W, the distance calculation unit 30 cannot calculate the distance of the portion at which it is not possible to sufficiently recognize the pattern on the surface of the target W. In the case of the target W having transparency, the pattern light will penetrate the target W and not sufficiently reflect towards the photographing units 30A, 30B, and it becomes difficult to recognize the pattern projected by the pattern light in the image captured by the photographing units 30A, 30B. In the case of the target W having transparency, there is a tendency for the calculation of distance by the distance calculation unit 40 becoming more difficult as the light quantity of the projecting unit 10 becomes smaller. "having transparency" is not limited to colorless transparency, and includes colored transparency or translucent.

The image generation unit 50 generates a distance image representing the distance until the target W or placement surface P at every two-dimensional position calculated by the distance calculation unit 40 by way of the shade of pixel of this two-dimensional position. The image generation unit 50 gradient expresses so that the shade changes from the maximum distance until minimum distance which are appropriately set. More specifically, the image generation unit 50 generates a distance image in which the brightness represents by grayscale of the 256 tones 0 to 255, for example, the color of each pixel, where the brightness becomes the minimum value at the set maximum distance, and the brightness becomes the maximum value at the set minimum distance. In this case, the brightness of the pixel at a distance exceeding the maximum distance becomes the minimum value, and the brightness of a pixel at a distance less than the minimum distance becomes the maximum value. In addition, the image generation unit 50 defines the brightness of a pixel corresponding to a position at which not possible to calculate distance as the minimum value. In other words, the image generation unit 50, in the case of not being able to recognize the characteristic point of the pattern depicted on the surface of the target W or placement surface P by the pattern light, sets the brightness of the corresponding pixel to the same brightness as infinity.

The image generation unit 50 sets the maximum distance in the gradient expression of the distance image to a distance larger than the distance of the placement surface P. The brightness of pixels of the placement surface P in the distance image becomes a value larger than the minimum value, whereby it becomes possible to distinguish pixels of positions at which the distance cannot be calculated by the distance calculation unit 40.

In addition, the image generation unit 50 preferably sets the minimum distance in the gradient expression of the distance image to a value larger than the distance of the placement surface. On the surface of the target W and placement surface P, the brightness of coordinates at which the distance is calculatable by the distance calculation unit 40 all become the maximum value. On the other hand, since the brightness of a pixel at a position at which distance cannot be calculated by the distance calculation unit 40 is the minimum vale, and since the contrast between a position at which distance cannot be calculated by the distance calculation unit 40 and a position at which distance can be calculated becomes the maximum, it becomes easier for the contour extraction unit 60 explained next to detect the contour of the target W. In the case of setting the minimum distance in the gradient expression of the distance image to a value larger than the distance of the placement surface, this gradient may be two tones (monochrome).

The contour extraction unit 60 recognizes the contour of the target W in the distance image, by pattern recognizing the contour shape of the target W from the distance image generated by the image generation unit 50 by way of a well-known image processing technique. More specifically, although noise may exist in the distance image, the brightness of a pixel of the target W basically is the minimum value, and the brightness of a pixel of the placement surface P is a fixed larger value (maximum value in the case of setting the minimum distance in the gradient expression of the distance image to a value larger than the distance of the placement surface). For this reason, the contour extraction unit 60 extracts a portion resembling the contour shape of the target W in the profile of a portion having low brightness in the distance image, as the contour of the target W.

Figure 2:
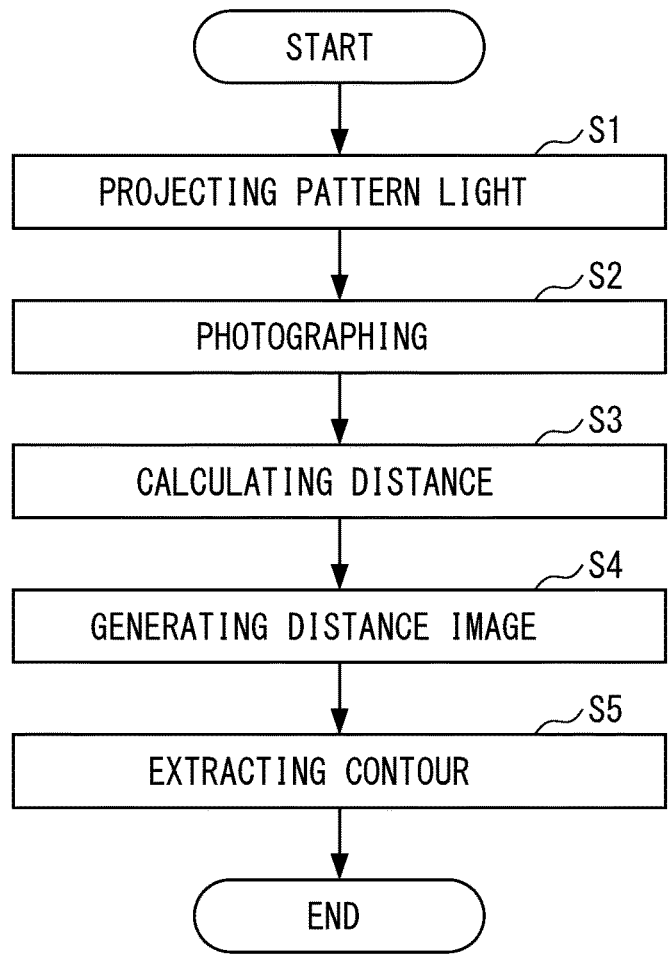
FIG. 2 is a flowchart showing the sequence of a contour recognition method performed by the contour recognition device in FIG. 1.

Next, a sequence of a contour recognition method related to an embodiment of the present disclosure which can be performed by the contour recognition device 1 will be explained. FIG. 2 is a flowchart showing the sequence of a contour recognition method performed by the contour recognition device 1. For this reason, the contour recognition method of FIG. 2 will be explained using the reference symbols attached to constituent elements of the contour recognition device 1 in FIG. 1.

Figure 3:
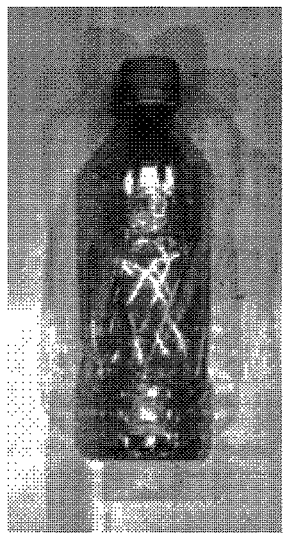
FIG. 3 is an image exemplifying a target of detecting the contour by the contour recognition device in FIG. 1.

The contour recognition method in FIG. 2 is a contour recognition method which recognizes the contour of a target W arranged on the placement surface P. FIG. 3 exemplifies a target W having transparency. FIG. 3 is an example of an image captured by a photographing device A in a state not projecting the pattern light from the projecting unit 10. As illustrated, it is difficult to recognize the contour of the target W in a normal image.

The contour recognition method in FIG. 2 includes: a step of projecting pattern light onto the target W and placement surface P (Step S1: projecting step); a step of capturing images including reflected light of the pattern light from the target W and the placement surface P from different viewpoints (Step S2: photographing step); step of calculating a distance from a parallax of two images captured from different viewpoints until the target W and the placement surface P at every two-dimensional position (Step S3: distance calculating step); a step of generating a distance image which gradient expresses the distance calculated from two images at every two-dimensional position, and represents a position at which distance cannot be calculated in the distance calculating step by a different tone (typically same tone as maximum distance) (Step S4: distance image generating step); and step of extracting a contour of the target by image processing the distance image (Step S5: contour extracting step).

The projecting step of Step S1 projects the pattern light onto the target W and the placement surface P by way of the projecting unit 10. The light quantity of the pattern light is set so as not to be able to calculate at least a distance of the contour of the target W, and able to calculate a distance of the placement surface P. Such a setting of the light quantity can be established as a calibration in which a sample of the target W is first arranged on the placement surface P, and performed by a manual operation while the operator confirms the distance image, upon continuously detecting the contour of a target W of the same type. In addition, the setting of the light quantity, in the case of arranging the target W at a position and orientation decided in advance, may be configured so that the contour recognition device 1 can automatically adjust the intensity of the pattern light, by storing the coordinates of pixels which are the edge part of the target W in the processed image in the contour recognition device 1, and the operator arranging the target W at a position and orientation decided in advance.

In the photographing step of Step S2, the target W and placement surface P, on which a pattern is projected to the surface with the pattern light projected onto, are captured by the two photographing units 30A, 30B. Attributed to the positions differing between the photographing units 30A, 30B, the two captured images of the photographing units 30A, 30B become images in which each part of the subjects (target W and placement surface P) is shifted by a distance according to the distance from the photographing units 30A, 30B, i.e. images having a parallax.

In the distance calculating step of Step S3, based on the parallax of the two images captured by the photographing units 30A, 30B, the distance from the photographing units 30A, 30B of each part is calculated. At this time, since it is guaranteed that the characteristic points of the pattern by the pattern light are the same points on the surface of the target W or placement surface P, by calculating the distance for the characteristic points of the pattern, it is possible to relatively accurately calculate the distance until each two-dimensional position of the target W and placement surface P in the captured images.

In the distance image generating step of Step S4, a distance image representing the distance at every two-dimensional position by a gradient expression of the color of each pixel is generated. At this time, it is necessary to define the maximum distance in the gradient expression as at least the distance of the placement surface P, and it is preferable to define the minimum distance as at least the distance of the placement surface P.

Figure 4:
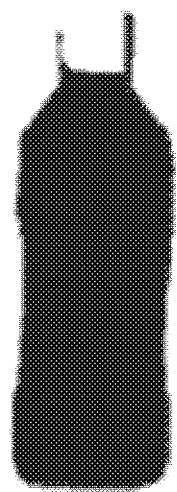
FIG. 4 is an example of a distance image in the case of defining the distance of the target in FIG. 3 as the maximum measurable.
Figure 5:
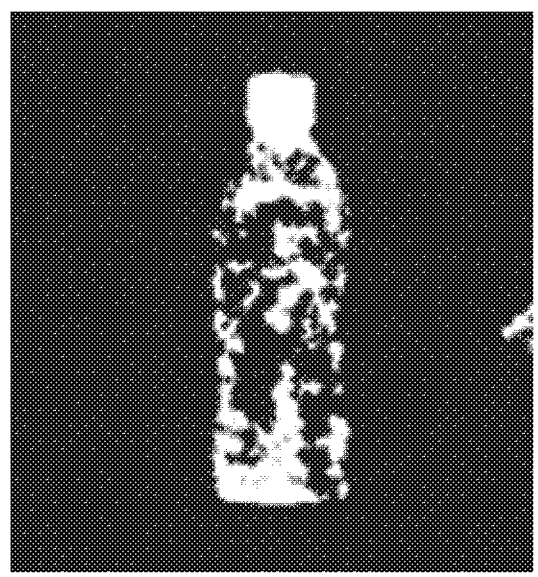
FIG. 5 is an example of a distance image of the target in FIG. 3 generated by the contour recognition device in FIG. 1.

FIG. 4 is an example of a distance image obtained in the distance image generating step. By defining the distance of the target W as uncalculatable, and defining the distance of the placement surface P as calculatable in this way, the brightness of pixels of the target W becomes the same as the brightness of infinity, and the brightness of the placement surface P at the periphery of the target W in a two-dimensional position becomes a brightness indicating a short distance. In contrast, FIG. 5 shows a distance image obtained in the case of setting the light quantity in the projecting step to a light quantity at which it is possible to make calculatable as much as possible the distance of a surface of the target W, as is conventionally. In the case of the target W having transparency in this way, it is difficult to make the distance of the surface of the target W as calculatable.

In the contour extracting step of Step S5, the contour of the target W in the distance image is recognized by way of a well-known image processing technique. So long as being the distance image shown in FIG. 4, it is possible to relatively correctly recognize the contour of the target W.

According to the contour recognition device 1 and contour recognition method as above, it is possible to make the contour of the target W easily recognizable by way of image processing, by adjusting the light quantity of the pattern light so that the distance of the surface of the target W becomes unmeasurable. For this reason, it is possible to accurately detect the contour of a target having transparency by way of the contour recognition device 1 and contour recognition method.

Figure 6:
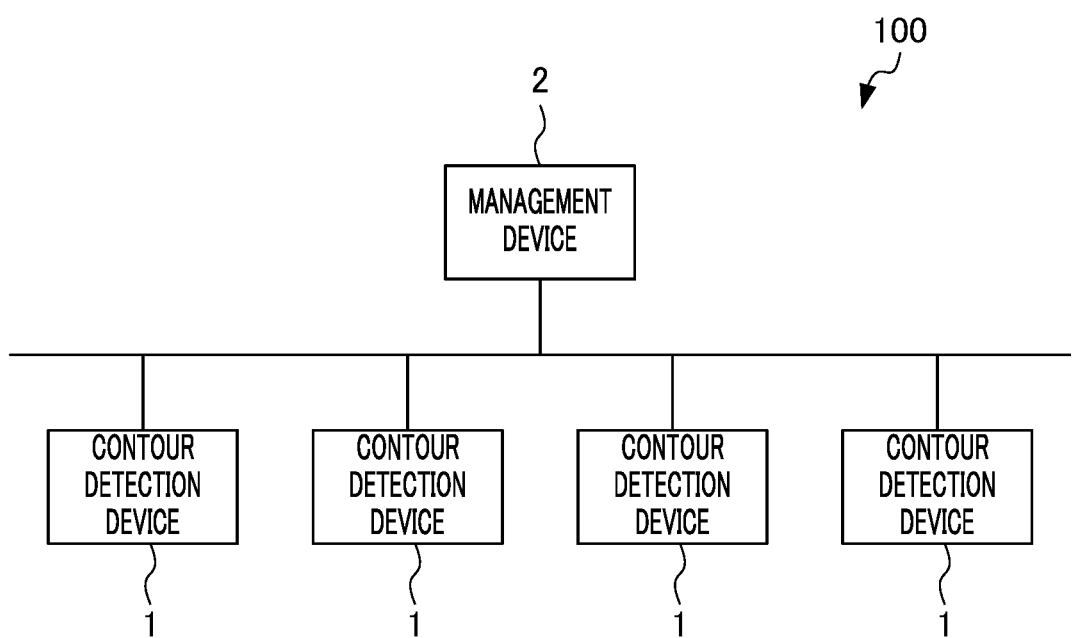
FIG. 6 is a schematic diagram showing the configuration of a contour recognition system according to an embodiment of the present disclosure.

A contour recognition system according to an embodiment of the present disclosure will be further explained. FIG. 6 is a schematic diagram showing the configuration of a contour recognition system 100.

The contour recognition system 100 includes a plurality of contour recognition devices 1, and a management device 2 connected to the plurality of contour recognition device 1 via a network.

The management device 2 collects information of the light quantity adjusted by the light quantity adjustment unit 20 from the plurality of contour recognition device 1. By the management device 2 collecting the information of light quantity applied to the target W, and providing information of the trends, etc. of light quantity set relative to targets W of the same type in another contour recognition device 1 upon processing a new type of target W in each contour recognition device 1, it is thereby possible to facilitate the adjustment of light quantity and improve the accuracy of contour recognition of the targets W. For this reason, the management device 2 is preferably configured so as to be able to estimate a more optimal light quantity, based on the information obtained from the plurality of contour recognition devices 1, by deep machine learning or the like.

Although an embodiment of the present disclosure has been explained above, the contour recognition device, contour recognition system and contour recognition method according to the present disclosure are not limited to the aforementioned embodiment. In addition, the effects described in the present embodiment are merely listing the most preferred effects produced from the present disclosure, and the effects from the present disclosure are not to be limited to those described in the present disclosure.

In the contour recognition device, contour recognition system and contour recognition method according to the present disclosure, the image generation unit may generate a distance image representing the positions at which distance cannot be calculated by the distance calculation unit by a different tone than the placement surface, other than the same tone as the maximum distance. As the tone different from the placement surface, it is possible to set as a specific tone whereby the matter of differing from the minimum distance or placement surface is evident, and may be a tone set according to the light quantity of the pattern light.

EXPLANATION OF REFERENCE NUMERALS 1 contour recognition device
2 management device
10 projecting unit
20 light quantity adjustment unit
30A, 30B photographing unit
40 distance calculation unit
50 image generation unit
60 contour extraction unit
100 contour recognition system
19
P placement surface
W target

What is claimed is:

1. A contour recognition device for recognizing a contour of a target disposed on a placement surface, the contour recognition device comprising:

a projecting unit which projects pattern light onto the target and the placement surface;
a light quantity adjustment unit which adjusts a light quantity of the pattern light of the projecting unit;
two photographing units which capture, from different viewpoints, images including reflected light of the pattern light from the target and the placement surface;
a distance calculation unit which calculates a distance until the target and the placement surface at every two-dimensional position from a parallax of images captured by the two photographing units from different viewpoints;
an image generation unit which generates a distance image which gradient expresses a distance calculated by the distance calculation unit from a maximum distance until a minimum distance at every two-dimensional position, and represents a position at which distance cannot be calculated by the distance calculation unit by a different tone than the placement surface; and
a contour extraction unit which extracts a contour of the target by way of image processing on the distance image generated by the image generation unit,
wherein the light quantity adjustment unit adjusts the light quantity of the projecting unit so that the distance of at least the contour of the target cannot be calculated, and the distance of the placement surface can be calculated by the distance calculation unit, and
wherein the image generation unit generates an image so that a maximum distance in gradient expression of the distance image becomes a distance greater than the distance of the placement surface.

2. The contour recognition device according to claim 1, wherein the image generation unit generates an image such that a minimum distance in the gradient expression of the distance image becomes a distance greater than the distance of the placement surface.

3. A contour recognition system comprising: a plurality of the contour recognition devices according to claim 1; and a management device which collects information of light quantity adjusted by the light quantity adjustment unit from the plurality of contour recognition devices.

4. A contour recognition method for recognizing a contour of a target disposed on a placement surface, the method comprising the steps of:

projecting pattern light onto the target and the placement surface;
capturing, from different viewpoints, images including reflected light of the pattern light from the target and the placement surface;
calculating a distance from a parallax of two images captured from the different viewpoints until the target and the placement surface at every two-dimensional position;
generating a distance image which gradient expresses the distance calculated from the two images at every two-dimensional position, and represents a position at which distance could not be calculated in the step of calculating the distance in a different tone from the placement surface; and
extracting a contour of the target by image processing on the distance image,
wherein the light quantity of the pattern light is set, in the step of projecting the pattern light, so that distance of at least a contour of the target cannot be calculated, and the distance of the placement surface can be calculated in the step of calculating the distance, and wherein a maximum distance in the gradient expression of the distance image is set, in the step of generating the distance image, to a distance greater than the distance of the placement surface.

* * * * *